US009882971B2

(12) United States Patent
Sato

(10) Patent No.: US 9,882,971 B2
(45) Date of Patent: Jan. 30, 2018

(54) INFORMATION PROCESSING SYSTEM, CONTROL METHOD, AND RECORDING MEDIUM

(71) Applicant: FUJITSU LIMITED, Kawasaki-shi, Kanagawa (JP)

(72) Inventor: Takaya Sato, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/339,821

(22) Filed: Jul. 24, 2014

(65) Prior Publication Data

US 2015/0088991 A1 Mar. 26, 2015

(30) Foreign Application Priority Data

Sep. 25, 2013 (JP) .................................. 2013-198139

(51) Int. Cl.
| | | |
|---|---|---|
| G06F 15/16 | (2006.01) | |
| H04L 29/08 | (2006.01) | |
| G06F 9/50 | (2006.01) | |

(52) U.S. Cl.
CPC ........ *H04L 67/1002* (2013.01); *G06F 9/5083* (2013.01); *H04L 2209/30* (2013.01)

(58) Field of Classification Search
CPC ............. H04L 67/1002; H04L 2209/30; G06F 9/5083

(Continued)

(56) References Cited

U.S. PATENT DOCUMENTS 4,872,009 A * 10/1989 Tsukiyama .............. H03M 7/46
341/51
6,961,060 B1 * 11/2005 Mochizuki ........ H04L 29/06027
709/219

(Continued)

FOREIGN PATENT DOCUMENTS

| JP | 2008-176420 | 7/2008 |
|---|---|---|
| JP | 2008-269050 | 11/2008 |

OTHER PUBLICATIONS

Extended European Search Report dated Jan. 20, 2017 in related European Application No. 14179298.6.

(Continued)

*Primary Examiner* — Bharat N Barot
(74) *Attorney, Agent, or Firm* — Staas & Halsey LLP

(57) ABSTRACT

An information processing system includes a plurality of information processing apparatuses, and a control apparatus that collects data included in each of the plurality of information processing apparatuses. Each of the plurality of information processing apparatuses or the control apparatus determines a first number of first information processing apparatuses that compress the data or a second number of second information processing apparatuses that do not compress the data, the first information processing apparatuses and the second information processing apparatuses being included in the plurality of information processing apparatuses, based on a parameter involved in decompression processing by the control apparatus. The first number of first information processing apparatuses compress the data and transmit compressed data to the control apparatus, and the second number of second information processing apparatuses transmit non-compressed data to the control apparatus without compressing the data.

18 Claims, 13 Drawing Sheets

(58) Field of Classification Search
USPC ......... 709/202–205, 246–247; 382/232–233, 382/235
See application file for complete search history.

(56) References Cited

U.S. PATENT DOCUMENTS

| | | | | |
|---|---|---|---|---|
| 7,171,444 | B2* | 1/2007 | Deshpande | ............. H04L 69/04 709/203 |
| 7,330,901 | B2* | 2/2008 | Yoneda | ................... H04L 29/06 709/224 |
| 8,885,185 | B2* | 11/2014 | Fujisawa | ................ G03G 21/14 358/1.13 |
| 2003/0093568 | A1* | 5/2003 | Deshpande | ........... G06F 3/1462 709/247 |
| 2005/0134907 | A1* | 6/2005 | Obuchi | ................ H04N 19/423 358/1.15 |
| 2008/0263244 | A1* | 10/2008 | Mizuno | ................. G06F 3/0608 710/68 |
| 2009/0052420 | A1* | 2/2009 | Fischer | ................... H04L 47/10 370/338 |

OTHER PUBLICATIONS

Chih-Yu (Joey) Tang et al., "Network Aware Compression Based Rate Control for Printing Systems", IEEE, 2009 10$^{th}$ International Symposium on Pervasive Systems, Algorithms, and Networks, pp. 123-128, Dec. 14, 2009.

Chandra Krintz et al., "Adaptive On-the-Fly Compression", IEEE Transactions on Parallel and Distributed Systems, vol. 17, No. 1, pp. 15-24, Jan. 1, 2006.

Japanese Office Action dated Apr. 18, 2017 in related Japanese Application No. 2013-198139.

* cited by examiner

INFORMATION PROCESSING SYSTEM, CONTROL METHOD, AND RECORDING MEDIUM

CROSS-REFERENCE TO RELATED APPLICATION

This application is based upon and claims the benefit of priority from the prior Japanese Patent Application No. 2013-198139 filed on Sep. 25, 2013, the entire contents of which are incorporated herein by reference.

FIELD

The embodiments discussed herein are related to a data transfer technology.

BACKGROUND

In a high performance computing (HPC) system, the computing performance of an entire system is increased by managing a large number of computing servers and operating them concurrently. In management of a large number of computing servers in this type of HPC system, there may be a case in which control servers collect data such as files are collected from a large number of computing servers.

When a small number of control servers collect files from a large number of computing servers, however, there is a problem that a communication load several times higher than files transmitted from the computing servers is applied to the control servers.

From the viewpoint of mitigating a communication load, there is a method of reducing communication load by compressing a whole or part of data to be transferred. Specifically, in view of a load applied to a central processing unit (CPU) due to compression at the transmission source, the total of the CPU load at the transmission source and the communication load is kept to or below a communication load applied when compression is not performed. In this method, however, the CPU load at the transmission source is considered but a case is not considered in which data is transmitted from a larger number of computing servers to a small number of control servers.

Japanese Laid-open Patent Publication No. 2008-176420 is known as a related art, for example.

SUMMARY

According to an aspect of the invention, an information processing system includes a plurality of information processing apparatuses, and a control apparatus that collects data included in each of the plurality of information processing apparatuses. Each of the plurality of information processing apparatuses or the control apparatus determines a first number of first information processing apparatuses that compress the data or a second number of second information processing apparatuses that do not compress the data, the first information processing apparatuses and the second information processing apparatuses being included in the plurality of information processing apparatuses, based on a parameter involved in decompression processing by the control apparatus. The first number of first information processing apparatuses compress the data and transmit compressed data to the control apparatus, and the second number of second information processing apparatuses transmit non-compressed data to the control apparatus without compressing the data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

An object of the present disclosure is to provide a technology that shortens a time taken to collect data from a large number of information processing apparatuses.

First Embodiment

Figure 1:
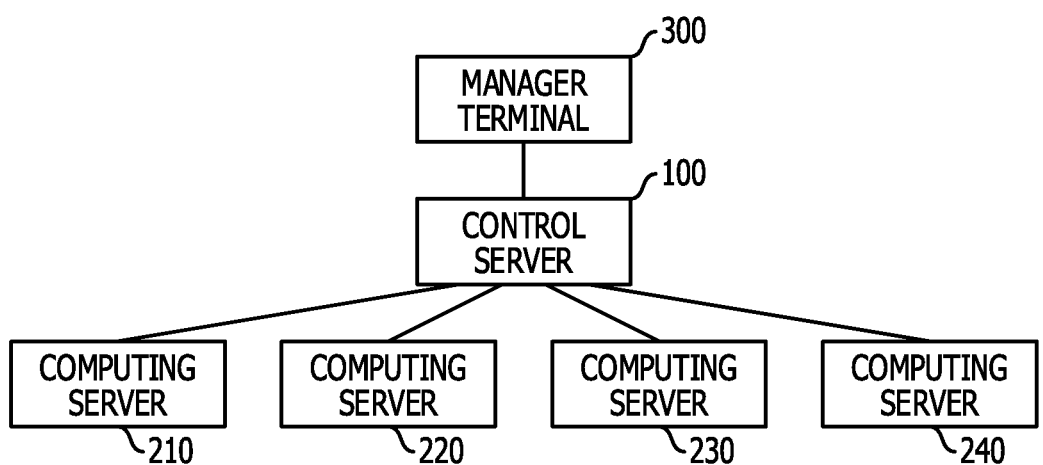
FIG. 1 outlines an information processing system in a first embodiment.

FIG. 1 outlines an information processing system in a first embodiment. The information processing system in the embodiment has a control server 100, computing servers 200 (in FIG. 1, 210 to 240), and a manager terminal 300.

The control server 100, which is coupled to the computing servers 210 to 240, manages the computing servers 210 to 240. The control server 100 also has a function that executes decompression (also referred to as expansion) when compressed data is received. The computing servers 210 to 240 execute prescribed computing processing and store files of computation results, log data for computing processing, and the like. The computing servers 210 to 240 also have a function that compresses a file to be transmitted to the control server 100.

The manager terminal 300, which is coupled to the control server 100, inputs a command to the control server 100 and also inputs parameters used to collect data such as a file from a computing server 200.

Figure 2:
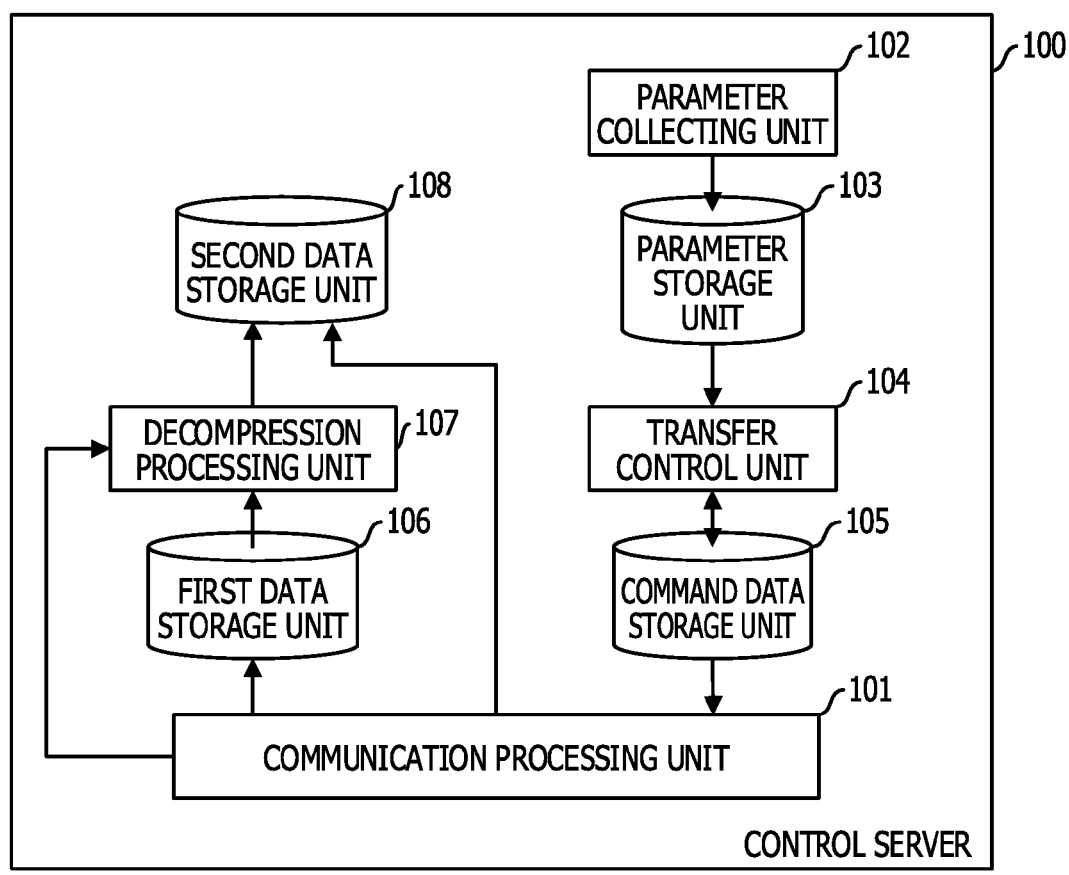
FIG. 2 is a functional block diagram of a control server.

FIG. 2 is a functional block diagram of the control server 100. The control server 100 has a communication processing unit 101, a parameter collecting unit 102, a parameter storage unit 103, a transfer control unit 104, a command data storage unit 105, a first data storage unit 106, a decompression processing unit 107, and a second data storage unit 108.

The communication processing unit 101 communicates with information processing apparatuses such as the computing servers 210 to 240. The parameter collecting unit 102 collects parameters used to calculate the number of computing servers 200 that will perform compression processing on a file to be collected, and stores the parameters in the parameter storage unit 103.

According to parameters stored in the parameter storage unit 103, the transfer control unit 104 calculates the number of computing servers 200 that will perform compression processing on a file to be collected. The transfer control unit 104 also performs processing to identify the computing servers 200 that perform the compression processing and stores command data for the identified computing servers 200 in the command data storage unit 105. The communication processing unit 101 transmits a file transfer command according to the command data stored in the command data storage unit 105.

Upon receipt of a file from a computing server 200, the communication processing unit 101 decides whether the file is a compressed file. If the file is a compressed file, the communication processing unit 101 stores the file in the first data storage unit 106. If the file is not a compressed file, the communication processing unit 101 stores the file in the second data storage unit 108.

The decompression processing unit 107 executes processing to concurrently decompress compressed files stored in the first data storage unit 106 according to a predetermined number of concurrent executions, and stores the decompressed files in the second data storage unit 108.

Figure 3:
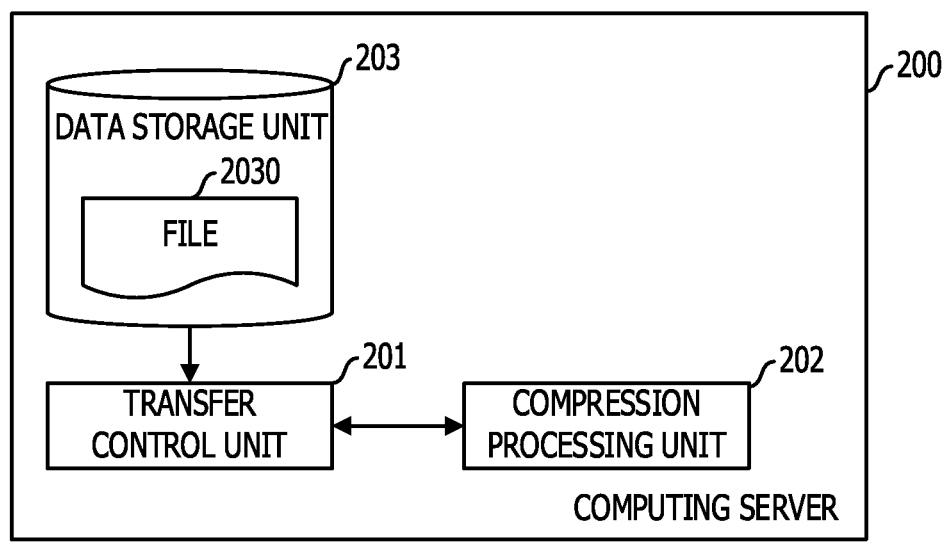
FIG. 3 is a functional block diagram of a computing server.

FIG. 3 is a functional block diagram of a portion, related to this embodiment, of the computing server 200. The computing server 200 has a transfer control unit 201, a compression processing unit 202, and a data storage unit 203. The data storage unit 203 stores a file 2030 to be transmitted to the control server 100.

The transfer control unit 201 decides whether to compress the file 2030 stored in the data storage unit 203 according to a file transfer command from the control server 100. If the file 2030 is to be compressed, the transfer control unit 201 causes the compression processing unit 202 to execute compression processing and transmits the compressed file to the control server 100. If the file 2030 is not to be compressed, the transfer control unit 201 reads out the file 2030 from the data storage unit 203 and transmits it to the control server 100.

Next, processing in this embodiment will be described by using FIGS. 4 to 7.

The parameter collecting unit 102 in the control server 100 receives a file collection command from the manager terminal 300 (step S1), and executes collection processing to collect parameters used to calculate the number of computing servers 200 that will perform file compression (step S3).

The received file collection command is stored in the parameter storage unit 103; the file collection command includes a list of the identifiers of computing servers 200 from which to collect a file a file.

In this embodiment, parameters to be collected are communication cost t in transmitting a non-compressed file from the computing server 200 to the control server 100, decompression cost d in decompressing one compressed file in the decompression processing unit 107, a file compression ratio z, the number N of computing servers 200 that will perform file transfer (here, N is the same as the number of files to be collected, but there may a case in which one computing server 200 transmits a plurality of files), and the number Nc of concurrent executions of decompression processing.

The parameter collecting unit 102 obtains these parameters from the manager terminal 300 in the form of, for example, a setting file. However, the number N of computing servers 200 that will perform file transfer may be determined from the list of the identifiers of computing servers 200 from which to collect a file a file. There may also be a case in which the number Nc of concurrent executions of decompression processing is the same as the number of CPU cores in the control server 100.

Figure 4:
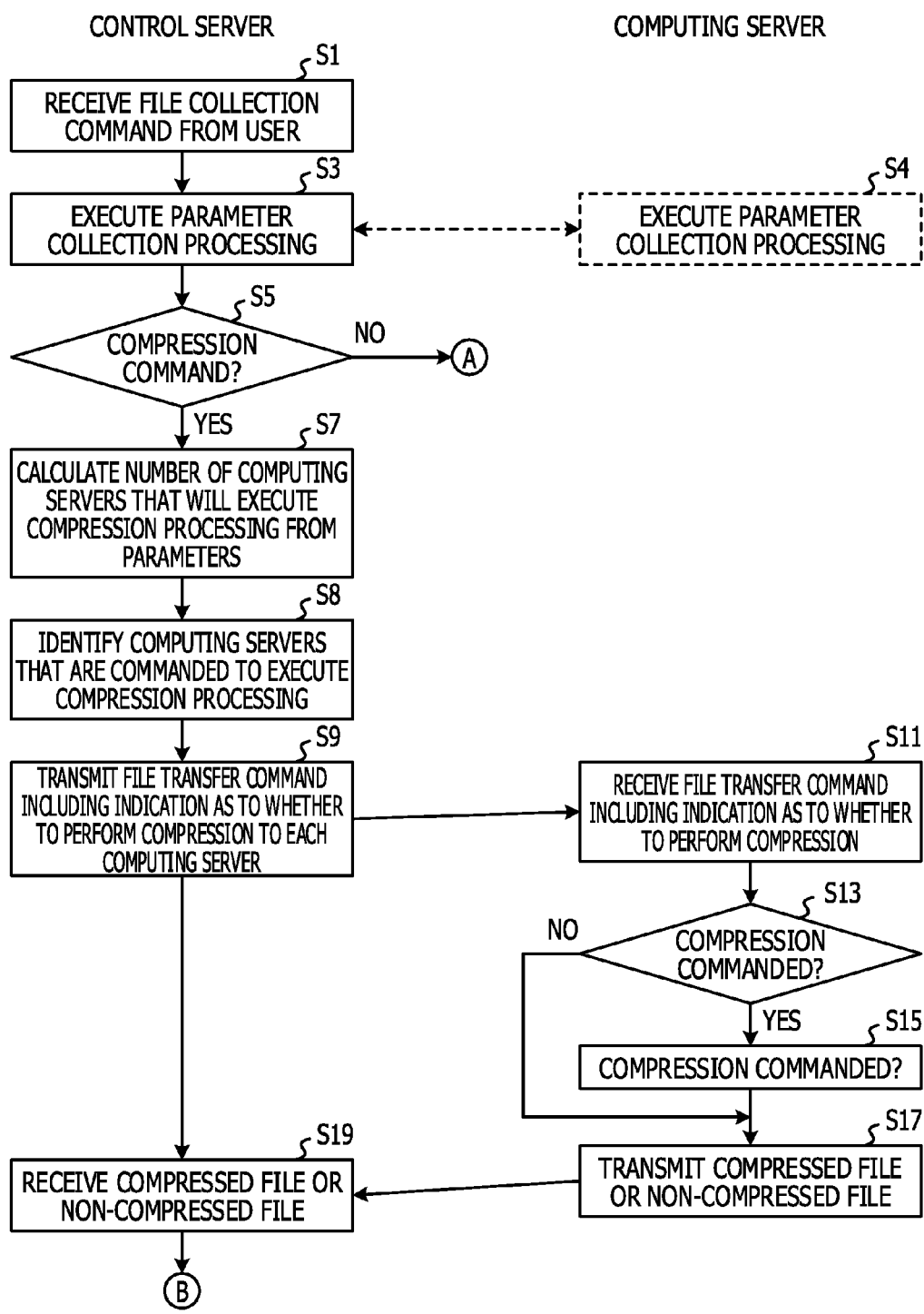
FIG. 4 illustrates a processing flow in the first embodiment.

Alternatively, in step S4 in FIG. 4, computing servers 200 may be asked whether they hold a file to be collected to create a list of computing servers 200 from which to collect a file a file, and the number of computing servers 200 in the list may be identified. As for the compression ratio parameter, an actual compression ratio may be obtained from the computing server 200. Other parameters may also be determined in advance in cooperation with the computing server 200 and the control server 100.

After this, the transfer control unit 104 decides according to the obtained parameters whether to create a compression command (step S5). For example, the transfer control unit 104 decides whether the condition that d/t is very smaller than N is met. This is because if N is not so large, an effect due to compression processing is not obtained. For example, the transfer control unit 104 decides whether N/(d/t) is Nc or more. For example, the transfer control unit 104 decides whether a core of the control server 100 can be efficiently used.

Figure 7:
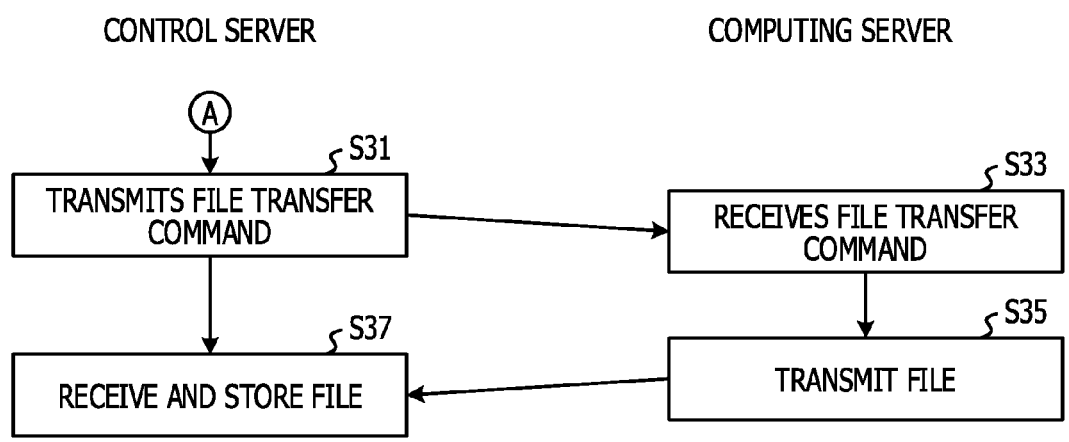

If the transfer control unit 104 decides not to create a compression command, processing proceeds through the terminal A to processing in FIG. 7.

If the transfer control unit 104 of the control server 100 decides to create a compression command, the transfer control unit 104 calculates the number n of computing servers 200 that will execute compression processing from parameters stored in the parameter storage unit 103, and stores the number n in the command data storage unit 105 together with the list of computing servers 200 from which to collect a file (step S7).

In this embodiment, some of the computing servers 200 from which to collect a file compress the file and then transmit the compressed file to the control server 100, and the remaining computing servers 200 from which to collect a file transmit the file to the control server 100 without compressing the file.

Figure 5:
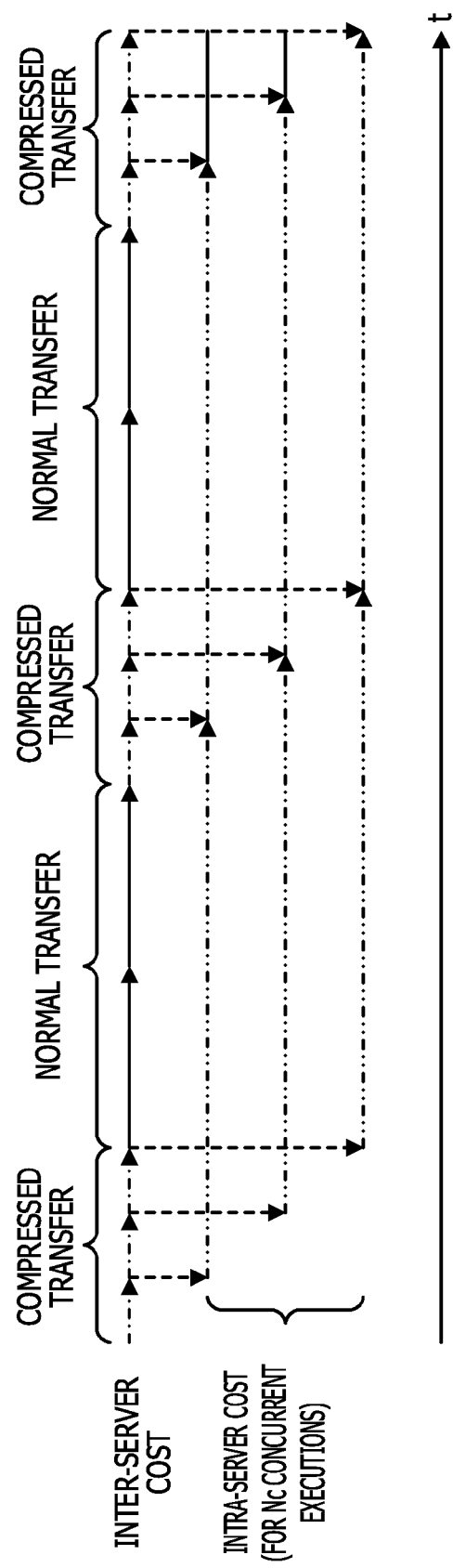
FIG. 5 illustrates a method of calculating the number of computing servers that will execute compression processing.

Here, as schematically illustrated in FIG. 5, the number n of computing servers 200 that will execute compression processing is calculated so that an inter-server cost, which is the sum of costs in transmitting compressed files (costs in compressed transfer: indicated by the lengths of the dash-dot lines) and costs in transmitting non-compressed files (costs in normal transfer: indicated by the lengths of the solid lines), does not exceed an intra-server cost, which is a cost in concurrently decompressing compressed files according to the number Nc of concurrent executions. This is because the inter-server cost and intra-server cost can be basically considered to have an exclusive relationship; for example, if the number of compressed transfers is increased, the inter-server cost is decreased but the intra-server cost is increased; if the number of compressed transfers is decreased, the inter-server cost is increased but the intra-server cost is decreased.

More specifically, the inter-server cost and intra-server cost are represented as follows, $$\text{Inter-server cost} = n(t/z) + (N-n)t$$

$$\text{Intra-server cost} = d[n/Nc]$$

where [ ] is a Gauss symbol, [x] indicating the maximum integer not larger than x. There is the prerequisite that n is much greater than Nc. This is because if the number of files is greater than Nc, decompression processing is executed many times, so a difference among times to start a plurality of pieces of decompression processing that are concurrently executed is negligible.

The relationships described above are represented as follows.

$$n(t/z)+(N-n)t \leq d[n/Nc]$$

It suffices to determine n so that this relationship is satisfied.

If the fractional part of n/Nc is represented as δ, the following equation is obtained.

$$n(t/z)+(N-n)t \leq d(n/Nc-\delta)n \leq \{zNcNt+dzNc\delta\}/\{Nct(z-1)+zd\} \quad (1)$$

If n is a multiple of Nc, δ is 0, so the following equation is obtained.

$$n \leq zNcNt/\{Nct(z-1)+zd\} \quad (2)$$

If the number n of computing servers 200 that will execute compression processing is large, the entire cost is substantially the same as the inter-server cost, so the following equation is obtained. This is because since intra-server processing (decompression processing) overlaps inter-server processing (communication processing), the entire cost is not explicitly affected, so when n is large, a difference among times in start processing in all concurrent decompression processing is also negligible.

Entire cost=inter-server cost

If the number N of computing servers 200 is large, the inter-server cost is dominant, in which case the intra-cost is within the inter-server cost as illustrated in FIG. 5.

Then, the following equation holds.

Entire cost=$n(t/z)+(N-n)t$

Since z is larger than 1, as n becomes larger, the entire cost is more reduced. That is, it is found that when n is maximized in equation (1) or (2), the entire cost is minimized. However, there may be a case in which after n has been calculated according to equation (1) or (2), the value of n is adjusted due to some factors.

Processing in FIG. 4 will be described again. The transfer control unit 104 identifies computing servers 200 that are commanded to execute compression processing from the list of computing servers 200 from which to collect a file according to the calculated number of computing servers 200, and stores, in the command data storage unit 105 for each computing server 200, data indicating whether compression processing is to be performed (step S8). For example, the transfer control unit 104 sequentially identifies as many computing servers 200 as the calculated number of computing servers 200 from the top of the list as computing servers 200 that are commanded to execute compression processing. Instead, computing servers 200 may be selected from the list at random.

Then, according to a result in processing in step S8, the communication processing unit 101 transmits a file transfer command including an indication as to whether to perform compression to each computing server 200 included in the list of computing servers 200 from which to collect a file (step S9). The communication processing unit 101 transmits a file transfer command with compression indicated to the computing servers 200 identified in step S8 and transmits a file transfer command without compression being indicated to other computing servers 200.

The transfer control unit 201 in the computing server 200 receives the file transfer command including an indication as to whether to perform compression (step S11) and decides whether compression is commanded (step S13). If compression is not commanded, processing proceeds to step S17.

If compression is commanded, the transfer control unit 201 reads out, from the data storage unit 203, the file 2030 to be collected and causes the compression processing unit 202 to execute prescribed compression processing (step S15). If a plurality of files are to be compressed, for example, they may be combined into one file and may be compressed at a time.

The transfer control unit 201 then transmits a compressed file or a non-compressed file to the control server 100 (step S17). If compression is not commanded, the transfer control unit 201 reads out the file 2030 from the data storage unit 203 and transmits the file 2030 without alteration. Steps S11 to S17 are executed for each computing server 200 from which to collect a file.

In contrast, the communication processing unit 101 in the control server 100 receives the compressed file or non-compressed file from a computing server 200. If the file is a non-compressed file, the communication processing unit 101 stores the file in the second data storage unit 108; if the file is a compressed file, the communication processing unit 101 stores the file in the first data storage unit 106 (step S19). The communication processing unit 101 counts the total number of received files. Processing proceeds through the terminal B to processing in FIG. 6.

Figure 6:
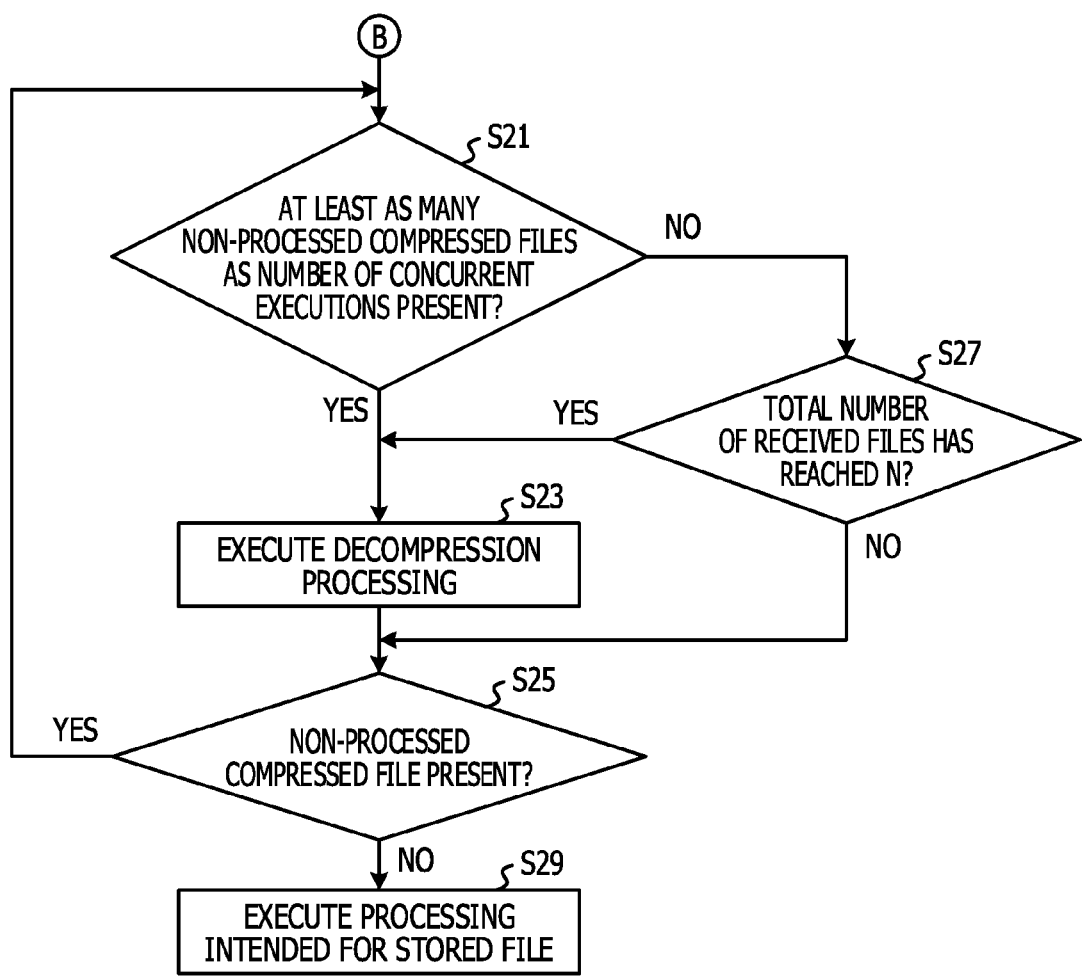
FIGS. 6 and 7 illustrate a processing flow in the first embodiment.

Now, processing in FIG. 6 will be described. The decompression processing unit 107 decides whether at least as many non-processed compressed files as the number of concurrent executions (Nc) have been stored in the first data storage unit 106 (step S21). If at least as many non-processed compressed files as the number Nc of concurrent executions have been stored, the decompression processing unit 107 concurrently executes decompression processing on as many non-processed compressed files as the number of concurrent executions (Nc) and stores the decompressed files in the second data storage unit 108 (step S23). Processing then proceeds to step S25.

If the number of non-processed compressed files is smaller than the number of concurrent executions, the decompression processing unit 107 decides whether the total number of received files, which are counted in the communication processing unit 101, has reached N (step S27). If the total number of received files has not reached N, processing proceeds to step S25. If the total number of received files has reached N, no more new compressed files can be obtained, so processing proceeds to step S23.

The decompression processing unit 107 then decides whether there is a non-processed compressed file in the first data storage unit 106 (step S25). If there is a non-processed compressed file, processing returns to step S21. If there is no non-processed compressed file, the control server 100 notifies, for example, the manager terminal 300 of the completion of collection and executes processing intended for the file stored in the second data storage unit 108 in response to a command from the manager terminal 300 (step S29).

When processing is performed as described above, the transfer processing cost of an entire system can be suppressed and transfer processing can be completed as early as possible.

Processing after the terminal A will be described by using FIG. 7. If compression has not been commanded, for all computing servers 200 from which to collect a file, the transfer control unit 104 stores, in the command data storage unit 105, a list of computing servers 200 for which non-compression has been set. The communication processing unit 101 then transmits a file transfer command without compression being indicated to each computing server 200 according to the computing server list stored in the command data storage unit 105 (step S31).

In contrast, if the transfer control unit 201 in the computing server 200 receives the file transfer command without compression being indicated from the control server 100 (step S33), the transfer control unit 201 reads out the file 2030 stored in the data storage unit 203 and transmits the file 2030 to the control server 100 without alteration (step S35).

The communication processing unit 101 in the control server 100 receives the file 2030 from each computing server 200 and stores the file 2030 in the second data storage unit 108 (step S37).

When processing is performed as described above, the control server 100 can collect a file from each computing server 200.

Although, in the above description, the number n of computing servers 200 that will perform compression processing has been calculated, the number of computing servers 200 that will not perform compression processing may be obtained by subtracting n from N and the computing servers 200 that do not perform compression processing may be identified.

Second Embodiment

Although, in the first embodiment, the control server 100 has determined which computing servers 200 perform compression processing, each computing server 200 may determine whether the computing server 200 performs compression processing by itself.

Although processing described below partially differs from the first embodiment, the structures of the functional blocks illustrated in FIGS. 2 and 3 are applicable to this embodiment as well.

Figure 8:
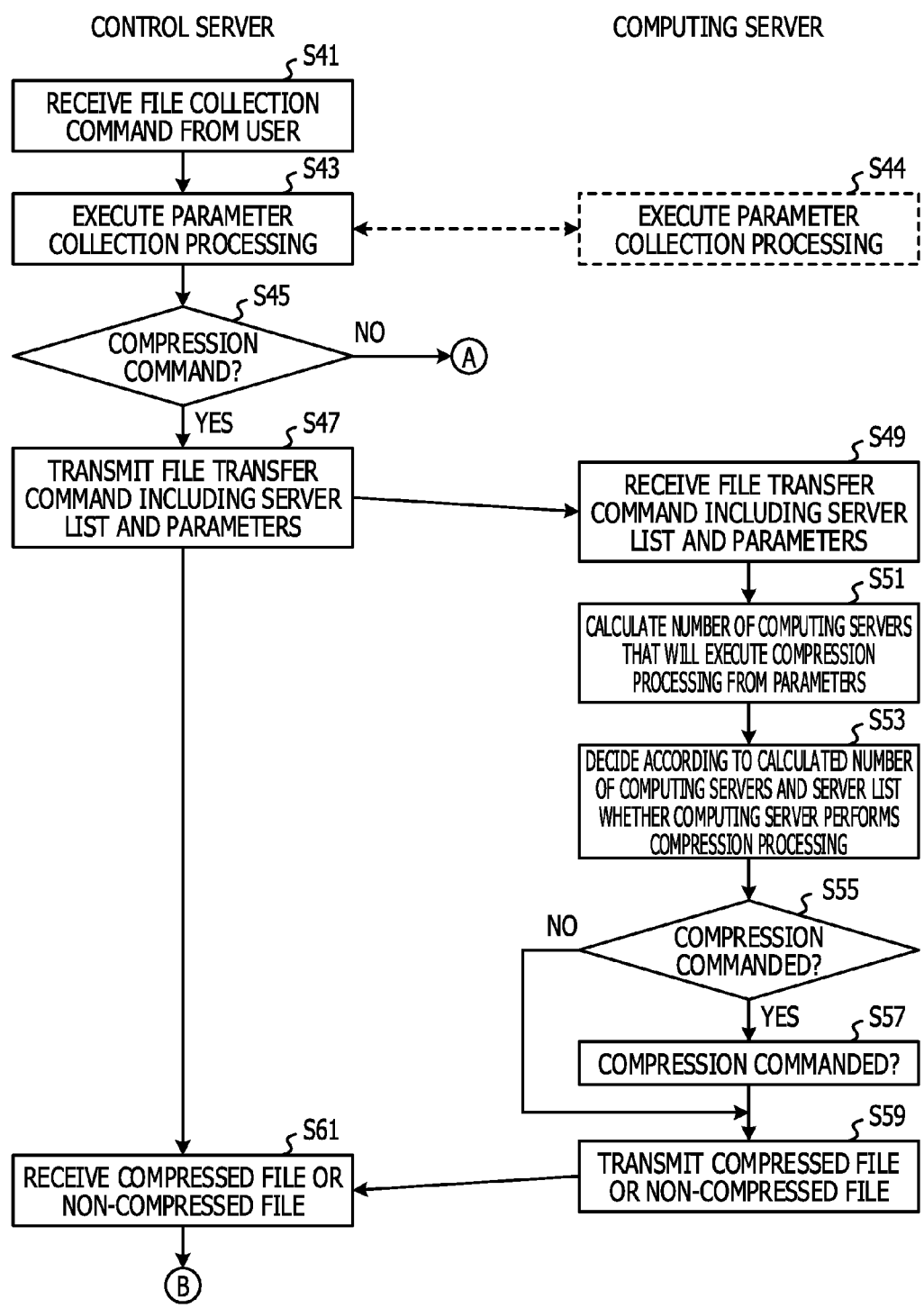
FIG. 8 illustrates a processing flow in a second embodiment.

Processing in this embodiment will be described by using FIG. 8.

The parameter collecting unit 102 in the control server 100 receives a file collection command from the manager terminal 300 (step S41 in FIG. 8) and executes collection processing to collect parameters used to calculate the number of computing servers 200 that will perform file compression (steps S43 and S44). These steps are the same as steps S1 to S4 in the first embodiment.

After this, the transfer control unit 104 decides according to the obtained parameters whether to create a compression command (step S45). This step is the same as step S5 in the first embodiment.

If the transfer control unit 104 decides not to create a compression command, processing proceeds through the terminal A to processing in FIG. 7. Since processing in FIG. 7 is the same as in the first embodiment, its description will be omitted.

If the transfer control unit 104 of the control server 100 decides to create a compression command, the transfer control unit 104 stores, in the command data storage unit 105, parameters stored in the parameter storage unit 103 (parameters used to calculate the number of computing servers 200 that will execute compression processing) and a list of computing servers 200 from which to collect a file (referred to below as the server list).

The communication processing unit 101 then transmits a file transfer command including the server list and parameters to each computing server 200 according to the server list (step S47).

The transfer control unit 201 in the computing server 200 receives the file transfer command including the server list and parameters from the control server 100 (step S49). Then, the transfer control unit 201 calculates the number n of computing servers 200 that will execute compression processing from the received parameters (step S51). This step is the same as step S7 except that the transfer control unit 201 in the computing server 200 executes the step instead of the transfer control unit 104 in the control server 100.

Then, the transfer control unit 201 decides according to the calculated number of computing servers 200 and the server list whether the computing server 200 to which the transfer control unit 201 belongs performs compression processing (step S53). Specifically, the transfer control unit 201 decides whether the local computing server 200 is included in a range of computing servers 200 that will execute compression processing in the server list, according to the rule that as many computing servers 200 as the calculated number of computing servers 200 are sequentially identified as computing servers 200 that will execute compression processing from the top of the server list (step S55).

If it is decided as a processing result in step S55 that compression is not commanded, processing proceeds to step S59.

If compression is decided not to be performed, the transfer control unit 201 reads out, from the data storage unit 203, the file 2030 to be collected and causes the compression processing unit 202 to execute prescribed compression processing (step S57).

The transfer control unit 201 then transmits a compressed file or a non-compressed file to the control server 100 (step S59). If compression is not commanded, the transfer control unit 201 reads out the file 2030 from the data storage unit 203 and transmits the file 2030 without alteration. Steps S49 to S59 are executed for each computing server 200 from which to collect a file.

In contrast, the communication processing unit 101 in the control server 100 receives the compressed file or non-compressed file from a computing server 200. If the file is a non-compressed file, the communication processing unit 101 stores the file in the second data storage unit 108; if the file is a compressed file, the communication processing unit 101 stores the file in the first data storage unit 106 (step S61). The communication processing unit 101 counts the total number of received files. Processing proceeds through the terminal B to processing in FIG. 6. Since processing in FIG. 6 is the same as in the first embodiment, its description will be omitted.

When processing is performed as described above, it becomes possible that the control server 100 only transmits a file transfer command and the computing server 200 autonomously compresses a file or leaves a file non-compressed. That is, a processing load on the control server 100 can be lowered.

Third Embodiment

Figure 9:
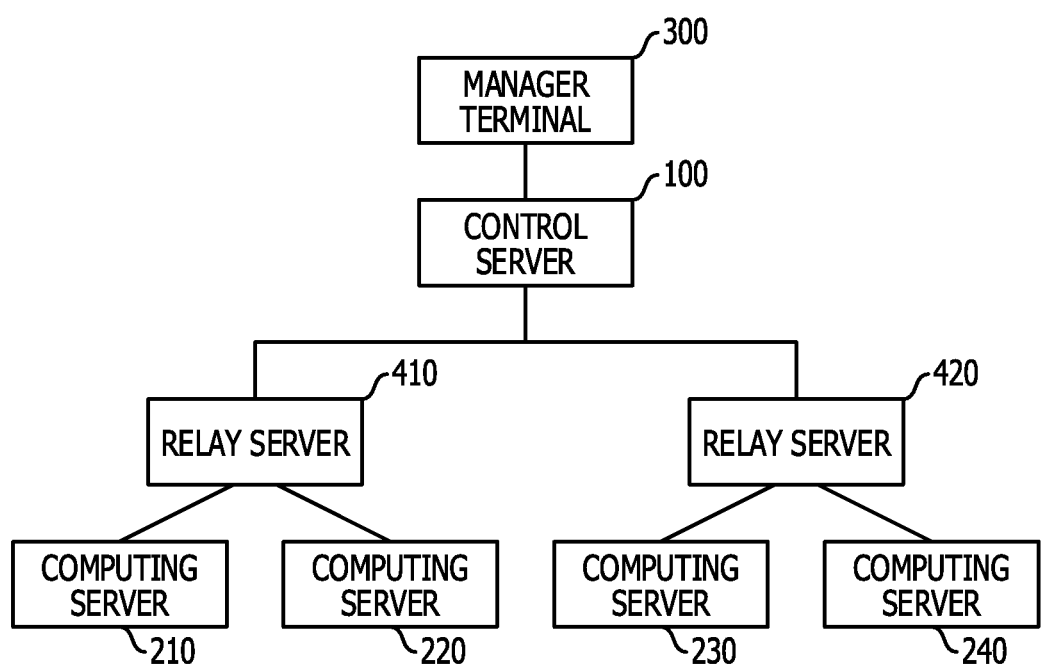
FIG. 9 outlines an information processing system in a third embodiment.

In the embodiments described above, the control server 100 has directly managed the computing servers 200, but as illustrated in FIG. 9, relay servers 400 (in FIGS. 9, 410 and 420) may be introduced between the control server 100 and the computing servers 200. There is no limitation on the number of relay servers 400.

The relay server 400 may have the functions of the computing server 200. Alternatively, the relay server 400 may only relay a file transfer command to the computing server 200 and may only relay a compressed file or a non-compressed file to the control server 100, as described below.

Figure 10:
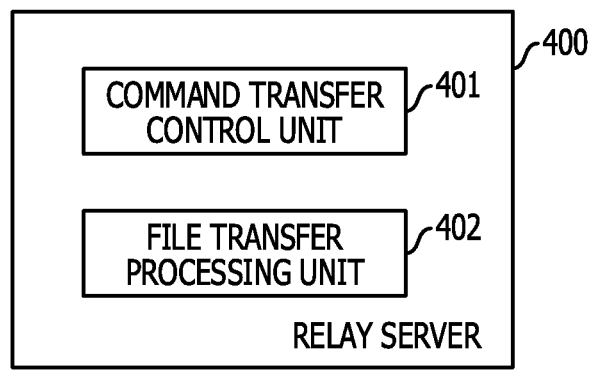
FIG. 10 is a functional block diagram of a relay server.

FIG. 10 is a functional block diagram of a portion, in this embodiment, of the relay server 400. The relay server 400 has a command transfer control unit 401 and a file transfer processing unit 402.

The command transfer control unit 401 receives a file transfer command from the control server 100. The command transfer control unit 401 then transmits the file transfer command to the computing server 200 under control of the relay server 400 or processes the file transfer command before transmitting it to the computing server 200 under control of the relay server 400.

The file transfer processing unit 402 receives a file from the computing server 200 and transfers the received file to the control server 100.

Figure 11:
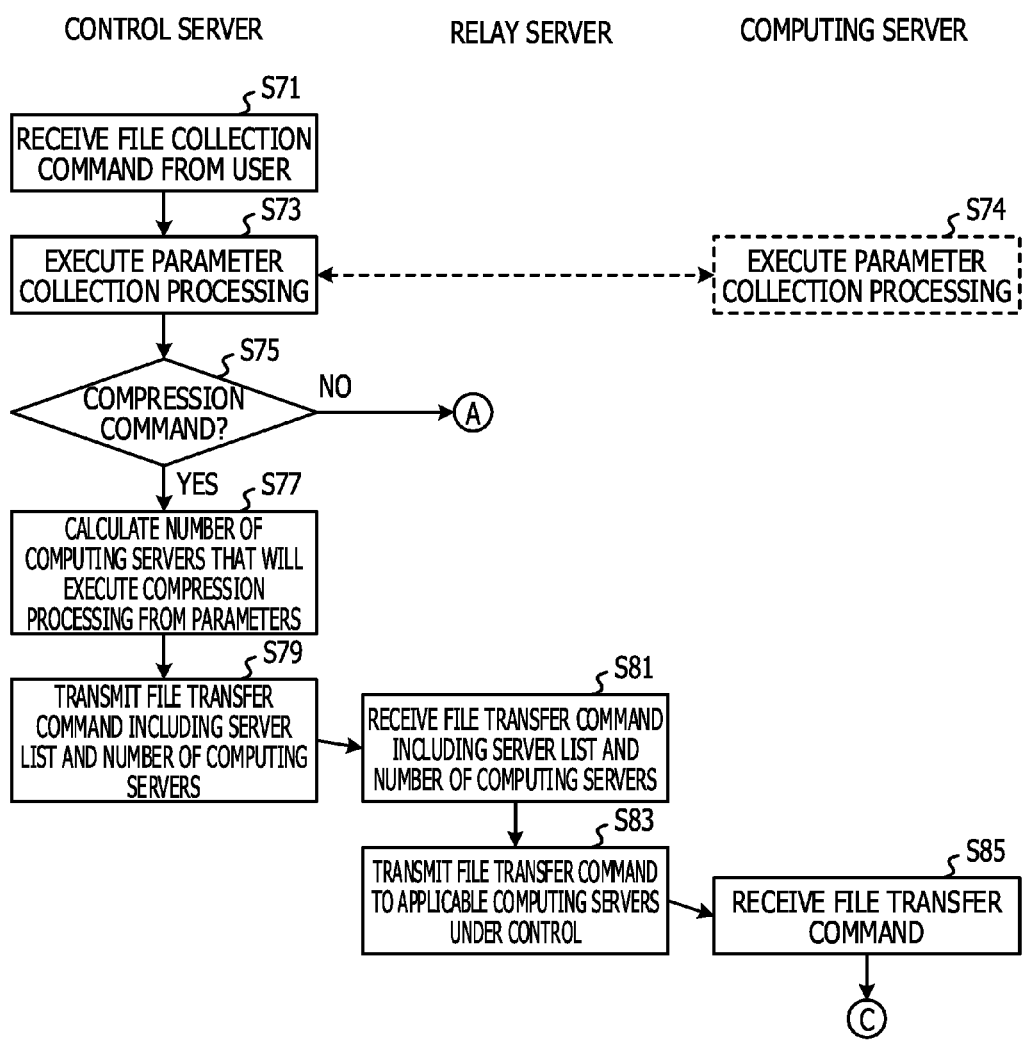
FIGS. 11 and 12 illustrate a processing flow in the third embodiment.
Figure 12:
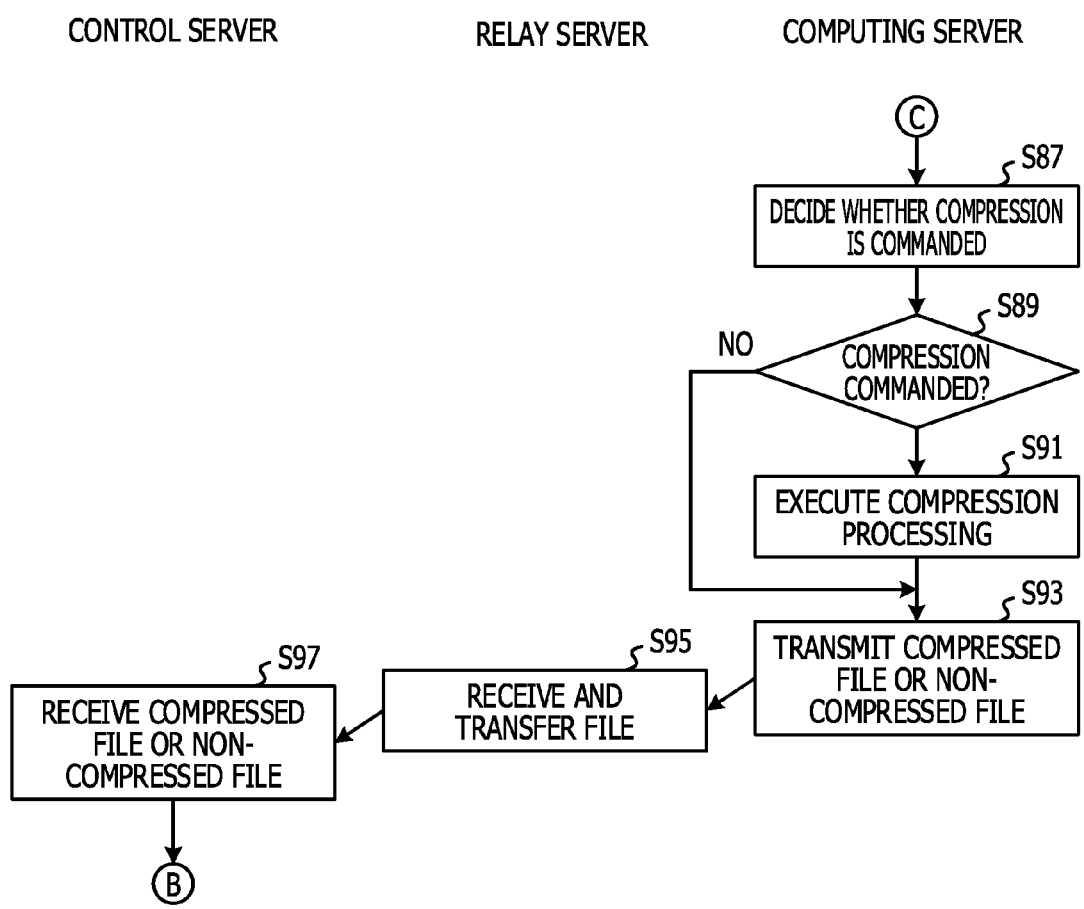

Next, a processing flow in this embodiment will be described by using FIGS. 11 and 12.

First, the parameter collecting unit 102 in the control server 100 receives a file collection command from the manager terminal 300 (step S71 in FIG. 11) and executes collection processing to collect parameters used to calculate the number of computing servers 200 that will perform file compression (steps S73 and S74). These steps are the same as steps S1 to S4 in the first embodiment.

After this, the transfer control unit 104 decides according to the obtained parameters whether to create a compression command (step S75). This step is the same as step S5 in the first embodiment.

If the transfer control unit 104 decides not to create a compression command, processing proceeds through the terminal A to processing in FIG. 7. Since processing in FIG. 7 is the same as in the first embodiment, its description will be omitted.

If the transfer control unit 104 of the control server 100 decides to create a compression command, the transfer control unit 104 calculates the number n of computing servers 200 that will execute compression processing from parameters stored in the parameter storage unit 103, and stores the number n in the command data storage unit 105 together with the list of computing servers 200 from which to collect a file (step S77). This step is the same as step S7 in the first embodiment.

Then, the communication processing unit 101 transmits, to the relay server 400, a file transfer command including the calculated number of computing servers 200 and a list of computing servers 200 from which to collect a file (referred to below as the server list) (step S79).

The command transfer control unit 401 in the relay server 400 receives the file transfer command including the server list and the number of computing servers 200 from the control server 100 (step S81), and transmits the received file transfer command to computing servers 200 that are under control of the relay server 400 and are included in the server list (step S83). Instead of transferring the file transfer command without alteration, the command transfer control unit 401 may decide whether computing servers 200 under its control are included within as many computing servers 200 that are sequentially counted in the server list from its top as the number of computing servers 200 included in the file transfer command. If enough computing servers 200 are included, the command transfer control unit 401 may transmit a file transfer command with compression indicated. If enough computing servers 200 are not included, the command transfer control unit 401 may transmit a file transfer command without compression being indicated.

The transfer control unit 201 in the computing server 200 receives the file transfer command from the relay server 400 (step S85). After this, processing proceeds through the terminal C to processing in FIG. 12.

The transfer control unit 201 of the computing server 200 then decides, from the file transfer command, whether compression is commanded (step S87). If the server list and the number of computing servers 200 are included in the file transfer command, the transfer control unit 201 decides whether the local computing server 200 is a computing server 200 that performs compression processing, as in step S53. If an indication as to command compression or non-compression is included in the file transfer command, the transfer control unit 201 makes a decision according to the indication.

If the transfer control unit 201 decides in processing in step S89 that non-compression is commanded, processing proceeds to step S93.

If compression is commanded, the transfer control unit 201 reads out, from the data storage unit 203, the file 2030 to be collected and causes the compression processing unit 202 to execute prescribed compression processing (step S91).

The transfer control unit 201 then transmits a compressed file or a non-compressed file to the relay server 400 (step S93). If compression is not commanded, the transfer control unit 201 reads out the file 2030 from the data storage unit 203 and transmits the file 2030 without alteration. Steps S85 to S93 are executed for each computing server 200 from which to collect a file.

In contrast, the file transfer processing unit 402 in the relay server 400 receives the compressed file or non-compressed file from the computing server 200 under control of the relay server 400 and transfers the received file to the control server 100 (step S95).

Then, the communication processing unit 101 in the control server 100 receives the compressed file or non-compressed file from the relay server 400. If the file is a non-compressed file, the communication processing unit 101 stores the file in the second data storage unit 108; if the file is a compressed file, the communication processing unit 101 stores the file in the first data storage unit 106 (step S97). The communication processing unit 101 counts the total number of received files. Processing proceeds through the terminal B to processing in FIG. 6. Since processing in FIG. 6 is the same as in the first embodiment, its description will be omitted.

Even if the relay server 400 is present as described above, a processing load on an entire system can be lowered as in the first embodiment.

So far, embodiments of the present disclosure have been described, but the present disclosure is not limited to these embodiments. For example, the structures of the functional blocks illustrated in FIGS. 2, 3 and 10 are only examples. There may be a case in which program module structures and file structures may differ.

In processing flows as well, sequences of steps may be changed or a plurality of steps may be concurrently executed if processing results are not changed.

Although equations (1) and (2) have been derived by comparing the inter-server cost with the intra-server cost, n calculation expressions obtained by comparing the communication cost with decompression cost may be used.

Figure 13:
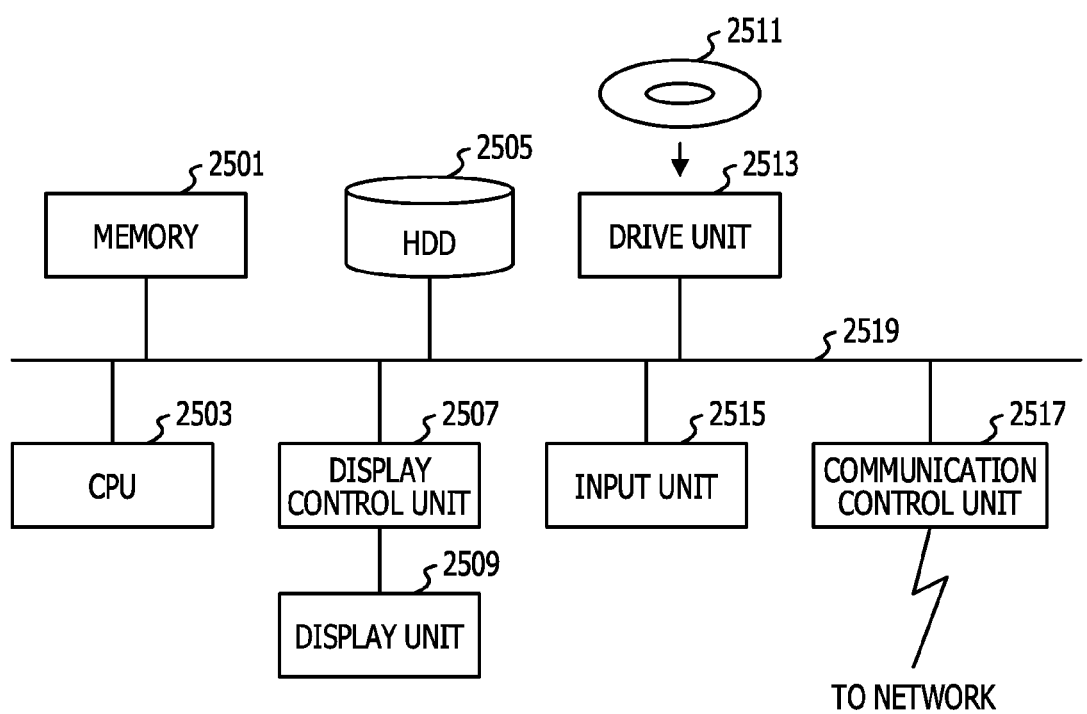
FIG. 13 is a functional block diagram of a computer.

The manager terminal 300, control server 100, computing server 200, and relay server 400 described above are each a computer apparatus in which a memory 2501, a central processing unit (CPU) 2503, a hard disk drive (HDD) 2505, a display control unit 2507 coupled to a display unit 2509, a drive unit 2513 for a removable disk 2511, an input unit 2515, and a communication control unit 2517 used to couple to a network are mutually coupled through a bus 2519 as illustrated in FIG. 13. An operating system (OS) and application programs that execute processing in the embodiments of the present disclosure are stored in the HDD 2505. When the CPU 2503 executes these programs, they are loaded from the HDD 2505 into the memory 2501. The CPU 2503 controls the display control unit 2507, communication control unit 2517, and drive unit 2513 depending on processing by the application programs so that they perform prescribed operations. Data in the middle of processing is mainly stored in the memory 2501, but the data may be stored in the HDD 2505. In the embodiments of the present disclosure, the application programs that execute the processing described above are distributed in the form of being stored on the removable disk 2511, which is computer-readable, and are installed from the drive unit 2513 in the HDD 2505. In some cases, the application programs are installed in the HDD 2505 through a network such as the Internet and the communication control unit 2517. In this type of computer apparatus, hardware components such as the CPU 2503 and memory 2501 described above and programs such as the OS and application programs efficiently cooperate to implement various functions as described above.

The embodiments of the present disclosure described above will be summarized below.

The information processing system in an embodiment has a plurality of information processing apparatuses and a control apparatus that collects data included in each of the plurality of information processing apparatuses. In information processing system, (A) each of the plurality of information processing apparatuses or the control apparatus determines a first number of first information processing apparatuses that will perform data compression or a second number of second information processing apparatuses that will not perform data compression, the first information processing apparatuses and second information processing apparatuses being included in the plurality of information processing apparatuses, according to parameters involved in decompression processing by the control apparatus, (B) the first number of first information processing apparatuses compress the data and transmit the resulting compressed data to the control apparatus, and (C) the second number of second information processing apparatuses non-compressed data to the control apparatus without compressing the data.

Thus, when parameters involved in decompression processing by the control apparatus, which would otherwise become a bottleneck, are used in data collection, a transfer time can be shortened.

When the control apparatus described above calculates the first number or second number, the control apparatus may execute at least one of (d1) processing in which first information processing apparatuses are selected from the plurality of information processing apparatuses and a compression command is transmitted to the selected first information processing apparatuses and (d2) processing in which second information processing apparatuses are selected from the plurality of information processing apparatuses and a non-compression command is transmitted to the selected second information processing apparatuses. Thus, the information processing apparatuses can easily decide whether to or not to perform compression.

Furthermore, (e) each of the plurality of information processing apparatuses or the control apparatus may identify at least one type of the first information processing apparatuses and the second information processing apparatuses from the first number or second number and a list of the plurality of information processing apparatuses. If the plurality of information processing apparatuses share a rule, each information processing apparatus can identify by itself whether the information processing apparatus is a first information processing apparatus or a second information processing apparatus.

Furthermore, there may be a case in which the first number or second number described above is determined according to a value that is calculated from a relational expression of a cost involved in decompression processing on compressed data, a communication cost for compressed data, and a communication cost for non-compressed data. If these costs are modeled together, the first number and second number that reduce the processing load on the control apparatus can be easily calculated.

Furthermore, the parameters described above may include at least the cost involved in decompression processing and the number of concurrent executions of decompression processing in the control apparatus.

Furthermore, there may a case in which the relational expression described above indicates that the cost involved in decompression processing on compressed data is smaller than or equal to the sum of the communication cost for compressed data and the communication cost for non-compressed data. The cost involved in decompression processing on compressed data is a cost in the control apparatus, and the communication cost for compressed data and communication cost for non-compressed data are an entire communication cost. If the cost in the control apparatus is not larger than the entire communication cost, an entire transfer time can be shortened.

Programs that cause a computer to execute processing as described above can be created. These programs are stored, for example, on a computer-readable recording medium or in a storage unit; examples of the computer-readable recording medium include optical disks such as a flexible disk and a compact disk-read-only memory (CD-ROM), a magneto-optic disk, a semiconductor memory (such as, for example, a ROM), and a hard disk. Data being processed is temporarily stored in a storage unit such as a random-access memory (RAM).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing system comprising:
a plurality of information processing apparatuses; and
a control apparatus that collects data included in each of the plurality of information processing apparatuses, wherein
each of the plurality of information processing apparatuses or the control apparatus determines a first number and a second number based on a parameter involved in decompression processing by the control apparatus,
first information processing apparatuses, an amount of the first information processing apparatuses being equal to the first number, in the plurality of information processing apparatuses compress data included in the first information processing apparatuses and transmit the compressed data to the control apparatus in response to a request from the control apparatus, and second information processing apparatuses, an amount of the second information processing apparatuses being equal to the second number, in the plurality of information processing apparatuses transmit non-compressed data included in the second information processing apparatuses to the control apparatus without compressing the data included in the second information processing apparatuses in response to the request, wherein the data included in the first information processing apparatuses is different than the data included in the second information processing apparatuses.

2. The information processing system according to claim 1, wherein when the control apparatus determines the first number and the second number, the control apparatus executes at least one of first processing in which the first information processing apparatuses is selected from the plurality of information processing apparatuses and a compression command is transmitted to the first information processing apparatuses, and second processing in which the second information processing apparatuses is selected from the plurality of information processing apparatuses and a non-compression command is transmitted to the second information processing apparatuses.

3. The information processing system according to claim 1, wherein each of the plurality of information processing apparatuses or the control apparatus identifies at least one of the first information processing apparatuses and the second information processing apparatuses, based on at least one of the first number and the second number, and a list indicating the plurality of information processing apparatuses.

4. The information processing system according to claim 1, wherein the first number and the second number is determined according to a value that is calculated from a relational expression of a cost involved in the decompression processing on the compressed data, a communication cost for the compressed data, and a communication cost for the non-compressed data.

5. The information processing system according to claim 4, wherein the relational expression indicates that the cost involved in the decompression processing on the compressed data is smaller than or equal to a sum of the communication cost for the compressed data and the communication cost for the non-compressed data.

6. The information processing system according to claim 1, wherein
the parameter includes at least a cost involved in the decompression processing and a number of concurrent executions of the decompression processing in the control apparatus.

7. A control method executed in an information processing system including a plurality of information processing apparatuses and a control apparatus that collects data included in each of the plurality of information processing apparatuses, the control method comprising:

determining a first number and a second number based on a parameter involved in decompression processing by the control apparatus;

compressing data included in first information processing apparatuses and transmitting the compressed data to the control apparatus in response to a request from the control apparatus by the first information processing apparatuses in the plurality of information processing apparatuses, an amount of the first information processing apparatuses being equal to the first number; and transmitting non-compressed data included in second information processing apparatuses to the control apparatus without compressing the data included in the second information processing apparatuses in response to the request by the second information processing apparatuses in the plurality of information processing apparatuses, an amount of the second information processing apparatuses being equal to the second number, wherein the data included in the first information processing apparatuses is different than the data included in the second information processing apparatuses.

8. The control method according to claim 7, further comprising:

when the control apparatus determines the first number and the second number, executing, by the control apparatus, at least one of first processing in which the first information processing apparatuses is selected from the plurality of information processing apparatuses and a compression command is transmitted to the first information processing apparatuses, and second processing in which the second information processing apparatuses is selected from the plurality of information processing apparatuses and a non-compression command is transmitted to the second information processing apparatuses.

9. The control method according to claim 7, further comprising:

identifying, by each of the plurality of information processing apparatuses or the control apparatus, at least one of the first information processing apparatuses and the second number information processing apparatuses, based on at least one of the first number and the second number, and a list indicating the plurality of information processing apparatuses.

10. The control method according to claim 7, wherein the determining determines the first number and the second number based on a value that is calculated from a relational expression of a cost involved in the decompression processing on the compressed data, a communication cost for the compressed data, and a communication cost for the non-compressed data.

11. The control method according to claim 10, wherein the relational expression indicates that the cost involved in the decompression processing on the compressed data is smaller than or equal to a sum of the communication cost for the compressed data and the communication cost for the non-compressed data.

12. The control method according to claim 7, wherein
the parameter includes at least a cost involved in the decompression processing and a number of concurrent executions of the decompression processing in the control apparatus.

13. A non-transitory computer-readable recording medium storing a program that causes a computer included in an information processing system including a plurality of information processing apparatuses to execute a process, the computer collecting data included in each of the plurality of information processing apparatuses, the process comprising:

determining a first number and a second number based on a parameter involved in decompression processing by the computer, wherein first information processing apparatuses, an amount of the first information processing apparatuses being equal to the first number, in the plurality of information processing apparatuses compress data included in the first information processing apparatuses and transmit the compressed data to the control apparatus in response to a request from the control apparatus, and second information processing apparatuses, an amount of the second information processing apparatuses being equal to the second number, in the plurality of information processing apparatuses transmit non-compressed data included in the second information processing apparatuses to the control apparatus without compressing the data included in the second information processing apparatuses to in response to the request, wherein the data included in the first information processing apparatuses is different than the data included in the second information processing apparatuses.

14. The non-transitory computer-readable recording medium according to claim 13, the process further comprising:

executing at least one of first processing in which the first processing apparatuses is selected from the plurality of information processing apparatuses and a compression command is transmitted to the first information processing apparatuses, and second processing in which the second information processing apparatuses is selected from the plurality of information processing apparatuses and a non-compression command is transmitted to the second information processing apparatuses.

15. The non-transitory computer-readable recording medium according to claim 13, the process further comprising:

identifying at least one of the first information processing apparatuses and the second information processing apparatuses, based on at least one of the first number and the second number, and a list indicating the plurality of information processing apparatuses.

16. The non-transitory computer-readable recording medium according to claim 13, wherein the first number and the second number is determined according to a value that is calculated from a relational expression of a cost involved in the decompression processing on the compressed data, a communication cost for the compressed data, and a communication cost for the non-compressed data.

17. The non-transitory computer-readable recording medium according to claim 16, wherein the relational expression indicates that the cost involved in the decompression processing on the compressed data is smaller than or equal to a sum of the communication cost for the compressed data and the communication cost for the non-compressed data.

18. The non-transitory computer-readable recording medium according to claim 13, wherein the parameter includes at least a cost involved in the decompression processing and a number of concurrent executions of the decompression processing in the computer.

* * * * *